AUTOMATIC TELECOMMUNICATION SWITCHING SYSTEMS

Filed Aug. 30, 1961

3,129,293
AUTOMATIC TELECOMMUNICATION SWITCHING SYSTEMS

Bloomfield James Warman, Charlton, London, England, assignor to Associated Electrical Industries Limited, London, England, a British company Filed Aug. 30, 1961, Ser. No. 134,905
Claims priority, application Great Britain Sept. 1, 1960
7 Claims. (Cl. 179—22)

This invention relates to automatic telecommunication switching systems and in particular to co-ordinate, or cross-point, switching systems employing relays.

As is known, a relay cross-point switching system employs "switches" each made up of a co-ordinate array of relay contact sets of which there is one such contact set at each cross-point between a plurality of vertical multiples and a plurality of horizontal multiples, each such multiple comprising a number of conductors according to the number of physical connections required to be established through the array in respect of a single communication path set up through it. For instance in a telephone exchange each multiple may comprise conductors corresponding to the + and − wires of a subscriber's line, together with other conductors affording control connections required for instance for line testing and holding purposes. Usually each contact set is controlled by an individual relay and will be so assumed herein, but the possibility is not excluded of the contacts of a set being controlled by two or more relays acting equivalently to a single relay. The terms horizontal and vertical in the context of co-ordinate switching are used only as a convenient mode of identifying the respective co-ordinate multiples: these multiples are not necessarily disposed horizontally and vertically in a practical layout.

Co-ordinate switching arrays as aforesaid are usually arranged in a number of switching stages each of which comprises a number of such arrays each affording access to some or all of the arrays in an adjacent stage. Adjacent stages are interconnected by multi-conductor paths, herein called links, which extend between the horizontal or vertical multiples of the switching arrays of one stage and horizontal or vertical multiples of the switching arrays of the next stage. By selective operation of the relays a communication path can be established, over the switching stages and the links between them, between multi-conductor trunks (as they will be called) which are connected to horizontal or vertical multiples of the switching arrays in the first and last, respectively, of the switching stages concerned. These trunks may extend, for instance, towards subscribers' lines on the one hand and towards other exchange equipment such as registers or supervisory circuits on the other hand. The establishment of such communication path between any two trunks is controlled by a control circuit which acts in dependence on the particular trunks involved and on which links are available and suitable for establishing the communication path between these trunks through the switching stages.

The present invention concerns a novel arrangement of such control circuit in respect of its mode of operating and holding the cross-point relays.

For the purpose of the invention the relay for each cross-point has an operating winding and a make contact connected in series with each other between control conductors included in the multiples defining the cross-point, whereby in respect of any communication path through the stages there can be established, by way of said control conductors and corresponding control conductors in the links between the stages, a control connection including the series-connected operating winding and make contact of a relay in each stage, the winding of such relay being in each case electrically nearer a particular end of the control connection than is the contact; a marking connection including a unidirectionally conductive device is taken to the junction between the winding of each relay and its make contact in series with it. To establish such communication path, still in accordance with the invention, an operating potential is applied to said particular end of the control connection and the marking connections for the relays involved are marked in turn, in sequence from said end, with a potential of such polarity with respect to the operating potential that the unidirectionally conductive devices in the marked marking connections will permit a resultant flow of operating current for the relays; after establishment of the communication path, that is, after operation of the last relay in said sequence, a holding connection for the operated relays is completed between on the one hand a holding potential connected at the other end of the control connection and having a polarity which is opposite to that of the operating potential with respect to the marking potential, and on the other hand a potential approximating to the marking potential and connected at the same end of the control connection as was the operating potential, thereby allowing the operating and marking potentials to be removed—for example on release of the control circuit to serve another call—without release of the relays. The establishment of the holding connection, which results in the flow of holding current through the serially connected operated relays in the established control connection, may be controlled at either end of the control connection: that is, either the holding potential may be permanently connected and the aforesaid potential approximating to the marking potential switched in at a suitable time after the operation of the last relay in the sequence, or this latter potential may be permanently connected and the holding potential switched in at a suitable time: in either case the switching means controlling the establishment of the holding connection may also be used for interrupting it to release the relays on clear-down of the communication path.

The invention and its advantages may be more fully understood on consideration of the accompanying drawings, in which.

Figure 4:
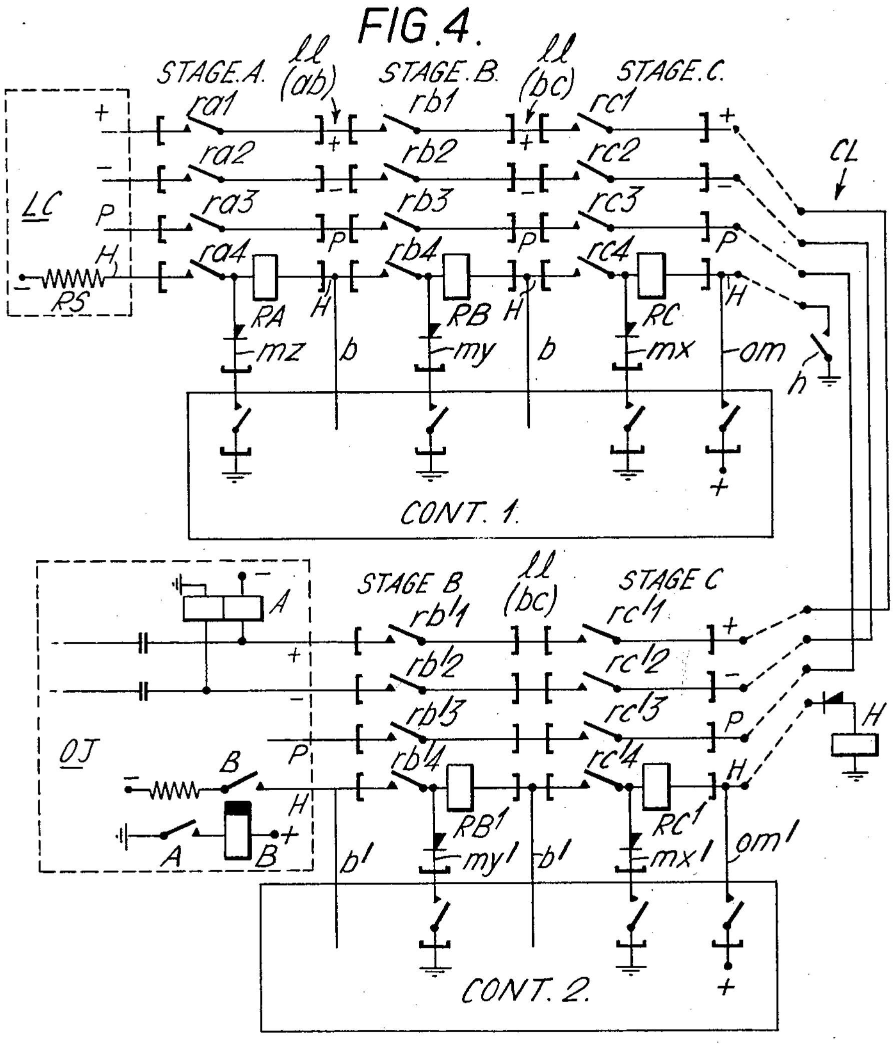

FIG. 4 serves to illustrate other possibilities arising from the adoption of the invention and also demonstrates the applicability of the invention over a greater number of tandem switching stages, it being appreciated that the invention is applicable over any number of stages, limited only by the number of cross-point relays that it is practical to operate and control in series.

Figure 1:
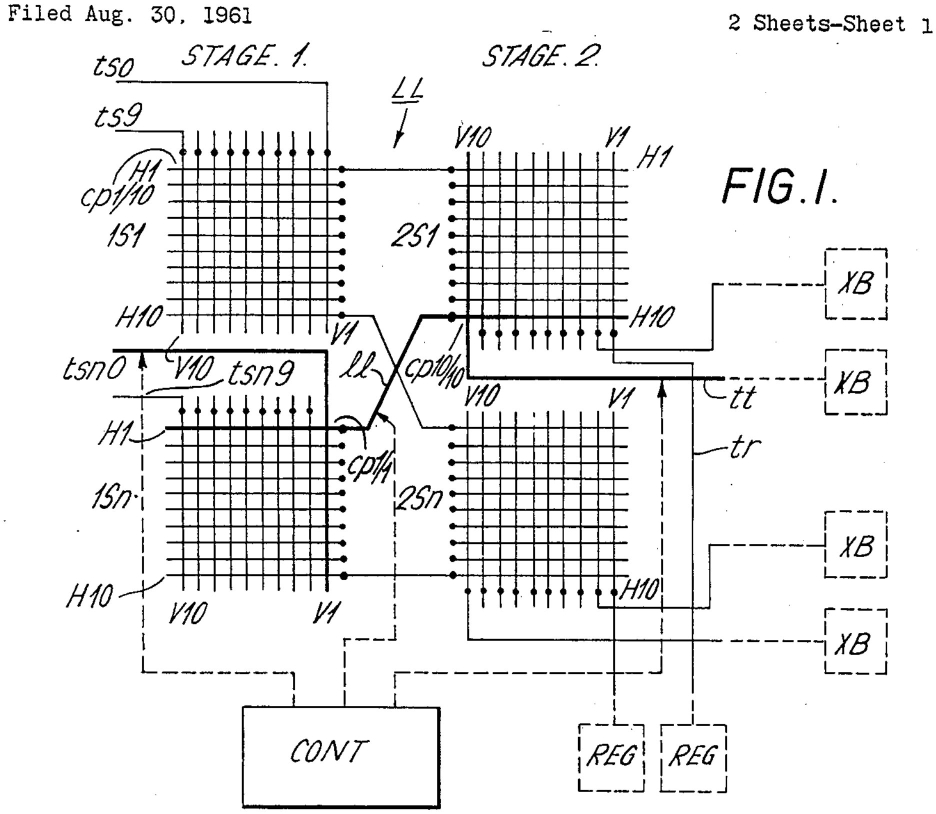
FIG. 1 illustrates in diagrammatic form two stages of co-ordinate relay switching.
Figure 2:
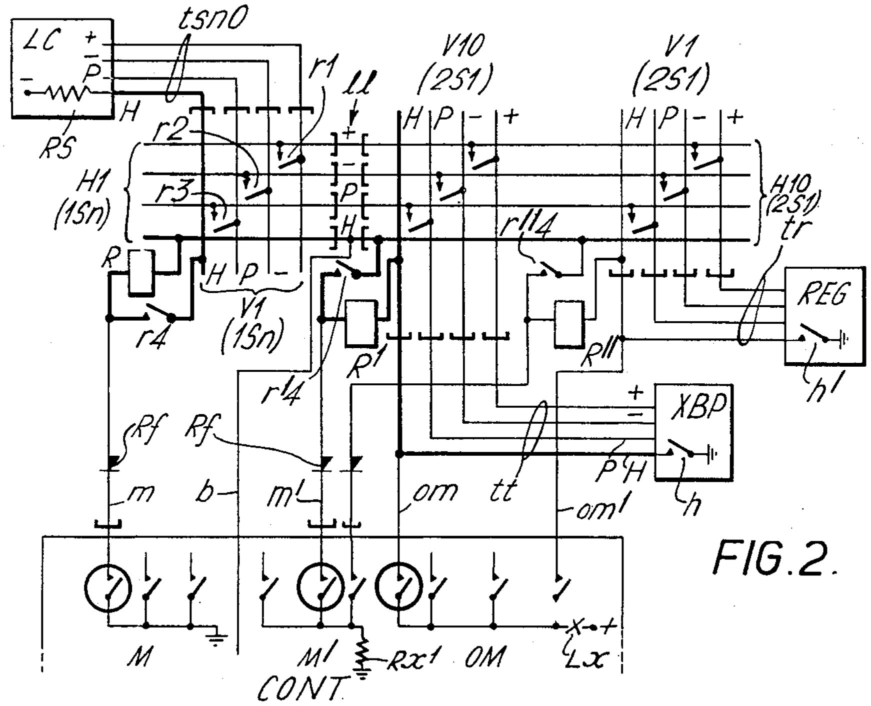
FIG. 2 illustrates for a communication path through these two stages the mode of operation in accordance with the invention of these cross-point relays, one in each stage, which are required to be selectively operated in order to establish such path.

FIGS. 1 and 2 are intended only to illustrate the principles of the invention and accordingly not to include details which are not relevant for this purpose: for instance in FIG. 2 the manner of controlling the marking contacts is not shown as this forms no part of the invention and is well within the understanding and ability of those versed in the design of relay cross-point systems, having regard to the usual marking arrangements which are included in such systems and in coordinate switching systems (including cross-bar systems) in general.

Referring to FIG. 1 two stages of relay cross-point switching are represented by the matrices 1S1 . . . **1S*n* for the first stage and 2S1 . . . 2S*n*** for the second stage.

Each of these matrices, for example 1S1, schematically represents a co-ordinate switching array of relay contact sets affording selective access between a number of vertical multiples V1–V10 on the one hand and a number of horizontal multiples H1–H10 on the other hand. For illustration it has been assumed that there are ten horizontal and ten vertical multiples in each array but these numbers are non-limiting and need not be equal. There is a relay contact set (not shown in FIG. 1) at each cross-point such as *cp*1/10 between a horizontal multiple (H1) and a vertical multiple (V10). As will be seen in FIG. 2, each multiple comprises a number of conductors (dependent on the number of physical connections required to be established in respect of a single communication path to be set up) and each cross-point contact set comprises a corresponding number of contact pairs each affording connection, when operated, between corresponding conductors from the two multiples defining the cross-point.

Multi-conductor links LL extend between the switching arrays of the two stages on their horizontal multiples H, there being at least one link from each switching array in either stage to each switching array in the other stage. This cross-linking between stages is in accordance with usual practice and need not be more fully explained here. The vertical multiples V of the switching arrays 1S1 . . . 1S*n* in stage 1 are connected to trunks *ts*0–*ts*9 . . . *tsn*0–*tsn*9 extending for instance towards respective subscribers' lines, and the vertical multiples V1–V10 of the switching arrays 2S1 . . . 2S*n* in stage 2 are connected to trunks such as *tt* and *tr* extending towards other exchange equipment. By way of example, the trunks such as *tr*, one from each array 2S1 . . . 2S*n*, have been illustrated as extending towards respective registers represented by the dotted rectangles REG, while the remaining trunks such as *tt* have been illustrated as extending, possibly through other switching stages, towards respective supervisory circuits each including a transmission bridge and equipment for effecting the usual supervisory functions; these supervisory circuits being represented by the dotted rectangles XB. The two switching stages permit the selective establishment through them, by way of the links LL, of communication paths extending between the trunks *ts* on the one hand and the trunks such as *tt* and *tr* on the other hand, this being controlled by a control circuit represented by the dotted rectangle CONT.

In describing the action of the control circuit in establishing such communication path in accordance with the invention, it will be assumed that the path is to be established between a subscriber's line circuit (LC, FIG. 2) connected to trunk *tsn*0 and a particular supervisory transmission bridge circuit (XBP, FIG. 2) connected to trunk *tt*. These two trunks being connected to switching arrays 1S*n* and 2S1 respectively, the path to be established has to include a link such as *ll* which affords access between these stages. Since trunk *tsn*0 is connected to vertical multiple V1 of array 1S*n* and link *ll* is connected to horizontal multiple H1 in that array, and since trunk *tt* is connected to vertical multiple V10 of array 2S1 with link *ll* connected to horizontal multiple H10 thereof, the establishment of the required path involves the operation of the relays for cross-points *cp*1/1 in array 1S*n* and *cp*10/10 in array 2S1.

These cross-points and the required path have been extracted for FIG. 2 and are shown in more detail therein. The path is assumed to include four physical connections, namely + and − speech connections, a test connection P and a holding connection H. Each cross-point relay such as R for *cp*1/1 and R' for *cp*10/10 therefore has a contact set of four contact pairs (*r*1, *r*2, *r*3, *r*4) by which these connections can be extended through the cross-point on operation of the relay. Each cross-point relay such as R has its winding connected in series with its contact *r*4 between the control (H) conductors included in the horizontal and vertical multiples defining the cross-point. As shown in thicker lines, there can thus be established, by operation of relays R and R', a control connection H extending from the control (H) conductor of trunk *tt* over H conductor of vertical multiple V10 of array 2S1, winding of relay R', contact *r'*4 of this relay, horizontal multiple H10 of array 2S1, H conductor of link *ll*, horizontal multiple H1 of array 1S*n*, winding of relay R, contact *r*4 of relay R and H conductor of vertical multiple V1 of array 1S*n* to the H conductor of trunk *tsn*0. This last conductor is terminated in the line circuit LC by a resistor RS connected to a source of negative holding potential, which becomes effective only after closure of contact *r*4.

From the junction between the operating winding of each relay such as R and R' and the contact such as *r*4 and *r'*4 in series therewith, a marking connection such as *m* for relay R and *m'* for relay R' is taken to the control circuit CONT. These marking connections include rectifiers R*f*. Also, from the H conductor of each trunk such as *tt* or *tr* connected to stage 2, constituting one end of the control connection as traced above, an individual marking connection *om* is taken to the control circuit.

In the control circuit CONT are three sets of contacts M, M' and OM. The contacts OM are selectively operated (in a manner not shown) according to the particular trunk such as *tt* or *tr* to which a communication path is to be established through the switching stages. This may be determined, for instance, according to a particular supervisory circuit or register that has been allocated. The operated OM contact connects a source of positive operating potential to the *om* marking connection leading to the H conductor of the relevant trunk. In the present example the encircled OM contact would be operated, thereby applying to the H conductor of trunk *tt* a positive operating potential which appears at one side of the winding of relay R' over the H conductor of the V10 multiple of array 2S1.

In the set of contacts M', each contact corresponds to a particular horizontal multiple in the several switching arrays 2S1 . . . 2S*n* of stage 2 and when operated extends an earth marking potential in common over these marking connections such as *m'* which go to relays associated with the same horizontal multiple in the several arrays. Thus the encircled M' contact corresponds to the H10 multiples of arrays 2S1 . . . 2S*n* and when operated extends an earth marking potential to relay R' in array 2S1 and to the corresponding relays in the other arrays of stage 2. In the present example relay M' relating to the H10 multiples will be operated because the link *ll* is connected to this multiple in array 2S1.

In the set of contacts M, each contact likewise corresponds to a particular vertical multiple in the several switching arrays 1S1 . . . 1S*n* in stage 1. For the present example, involving trunk *tsn*0 connected to the V1 vertical multiple in array 1S*n*, the encircled M contact will be operated to mark the marking connections *m* which go to the relays such as R associated with the V1 multiples in stage 1. It is not necessary to separately mark a horizontal multiple in stage 1 as the particular horizontal multiple involved (H1) is determined by, and is in due course marked from stage 2 over the H conductor of, the particular link *ll* which is involved in the communication path being set up.

The required path is set up as follows: the encircled OM contact is first closed to identify the trunk *tt* and supervisory circuit XBP by marking the H conductor of this trunk with the operating potential. Next the encircled M' contact is closed to apply the earth marking potential over connection *m'* to the junction of the winding of relay R' and its contact *r'*4. This relay operates to the potential difference thus applied across its winding (the rectifier R*f* being poled to permit the flow of operating current in this condition) and closes its contact *r*4. The encircled M contact is then closed and the previously operated M′ contact is opened. Consequently an earth marking potential appears at one side of the winding of relay R over marking connection *m*, and the operating potential is extended to the other side of its winding over the winding of relay R′, its now operated contact *r*′4 and the H conductors of link *ll* and multiple H1 of array 1S*n*. Relay R therefore operates to the potential difference and closes its contact *r*4. The operated M contact is then re-opened and the relays are held operated in series between the negative holding potential applied over resistor RS via contact *r*4 and the positive operating potential still applied at the opposite end of the control connection now established. Subsequently, for instance after the control circuit has found the line circuit LC to be free by testing the condition of the P-wire connection now extended through to the supervisory circuit XBP, supervision is transferred to this latter circuit which, *inter alia*, applies a holding earth at contact *h* to the adjacent end of the established control connection. The control circuit CONT can now be released, the operated OM contact being re-opened but the relays being held in series, dependent on contact *h*, between this holding earth potential and the negative holding potential at the line circuit.

The established control connection is free from interference by operation of the control circuit in establishing subsequent calls, because the rectifiers R*f* are now backed off by the negative potentials which now appear, by voltage divider action, at the junctions of the windings of relays R and R′ with their contacts *r*4 and *r*′4. Furthermore, the established control connection may be subsequently cleared down independently of the control circuit, and therefore irrespective of its condition, simply by interrupting the holding earth potential at contact *h*.

In determining a particular communication path to be established the control circuit may require to be signalled with the busy or free conditions of the links *LL* (FIG. 1) in order to enable a choice to be made of a free link suitable for establishing a required communication path through the switching stages. This requirement may arise, for instance, if there was more than one link between any switching array in the one stage and any particular array in the other stage, or if there were more than two switching stages in tandem, giving a choice of paths through the intermediate stage or stages between particular switching arrays in the first and last stages. With the arrangement of the invention, these conditions of the links LL can be determined from the potentials present on their H conductors. When a communication path has been established and the relays involved are held in the established control connection between the negative holding potential at one end and the holding earth at the other end, these relays will provide a potential dividing action which results in negative potentials being present on the H conductors of the relevant links (*ll*). These potentials can therefore be extended to the control circuit, over leads such as *b* in FIG. 2, as busy marking potentials. Links for which these negative potentials are absent are thereby denoted as being free.

The control circuit can ascertain the busy or free condition of a *ts* trunk according to the condition of its P-conductor, which itself will be marked, as is usual practice, according to the condition of its trunk. The busy or free condition of a trunk such as *tt* or *tr* (corresponding to the condition of the supervisory circuit or register with which it is associated) may be indicated to the control circuit as a marking applied by a contact which is operated in the supervisory circuit or register, as the case may be, when it is busy. This contact may be a separate contact provided for this purpose: alternatively by including between the *h* or *h*′ contact and the earth point shown, a resistance afforded for instance by a resistor or a relay winding (not shown in FIG. 2), the condition of the *tt* or *tr* trunk may be ascertained according to the potential on its H conductor.

A marking and operating procedure similar to that described may be used for establishing communication paths through the switching stages in respect of both calling and called lines; for any particular call two separate marking arrangements, one to deal with the calling side and the other to deal with the called side but possibly having their functions interchangeable, may be taken into use. As regards a calling line, this may first have to be given access to a register through the switching stages and then subsequently coupled to a supervisory transmission bridge circuit. To this end, again referring to FIG. 2, the control circuit may first establish a communication path between the trunk *ts* extending to the calling line and a trunk such as *tr* extending to a register allocated to deal with the call. The action would be as previously described, except that the OM contact operated in the control circuit would be that corresponding to the allocated register, operation of this contact resulting in application of the positive operating potential over lead *om*′ to the H conductor of trunk *tr*. Subsequently and in similar manner to that already described, the control circuit may establish between the trunk *tsn*0 and a trunk such as *tt* extending to a supervisory circuit, a communication path which may or may not include part of the already established path to the register: if it does, then after the path has been established to the supervisory circuit and the holding earth potential has been there applied (contact *h*), the register can be released and the resultant removal of a holding earth applied from it (contact *h*′) will cause the release of any relay (such as R″) involved in the register path, without releasing those involved in the path to the supervisory circuit.

Where there are more than two switching stages it is possible, in the manner just described, for a new communication path (for example to a supervisory circuit) to be tapped into an existing path (for example to a register) at any stage, whether it be a terminating stage or an intermediate stage: any cross-point relay common to both paths would be held operated in the control connection of the new path, while the relays no longer required in the old path would be released. There is also the possibility that in a similar manner calls may be re-routed through the switching stages while in progress, in order to take into use a more advantageous communication path that may have become available: this might be useful for instance in maintaining a high degree of call packing in the switching stages.

Figure 3:
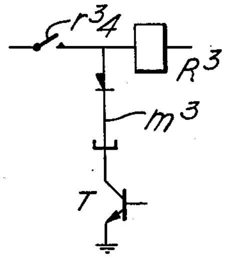
FIG. 3 illustrates a modified way of applying the marking potentials.

Instead of the M and M′ contacts for applying the marking potentials to the marking connections such as *m* and *m*′, static switching devices may be used. FIG. 3 illustrates the use of transistors for this purpose. Referring to FIG. 3, a typical marking connection $m^3$, connected to the junction between the winding of a cross-point relay $R^3$ and its series contact $r^34$, extends from the collector of a transistor T whose emitter is connected to earth. The transistor T is controlled on its base, and when rendered conductive applies the earth potential of its emitter as a marking potential on connection $m^3$ and on the other marking connections which are to receive this marking in common. The use of transistors instead of contacts could be expected to give increased life. The OM contacts of FIG. 2 could also be replaced by static switching devices appropriately connected to extend the required positive potential to the *om* leads. However, if these *om* leads are required for functions such as testing and signalling, it would be preferable to employ contacts since they provide the complete isolation which would then be desirable for these leads.

FIG. 4 illustrates by way of example the establishment of a communication path over three relay cross-point switching stages A, B and C between a line circuit LC and an outgoing junction circuit OJ. Only the cross-points involved in this path are shown, namely those with which relays RA, RB, RC, RC′ and RB′ are associated, and a mode of representation has been used which makes more immediately apparent the series connection of these relays and their series make-contacts (*ra4*, *rb4*, etc.) in the control connection (H) of the communication path. On the incoming side a control circuit CONT.1 controls in exactly the same manner as described with reference to FIG. 2 the establishment of a path between the line circuit LC and a free cross-linking trunk CL. This involves operation of cross-point relays RA in stage A, RB in stage B and RC in stage C, to which end the control circuit CONT.1 will apply positive operating potential to lead *om* and earth marking potentials successively to marking leads *mx, my, mz* (corresponding to leads *m, m'* in FIG. 2). The inter-stage links involved in this communication path are marked as *ll*(*ab*) between stages A and B and *ll*(*bc*) between stages B and C. Busy/free leads *b* have been shown extending into the control circuit from the H conductors of these links for the purpose already described in connection with FIG. 2.

On the outgoing side, control circuit CONT.2 likewise establishes a communication path between the cross-linking trunk CL and the required outgoing junction circuit OJ. It has been assumed that the outgoing junctions are connected to the B stage (rather than to the A stage as are the line circuits such as LC). Consequently control circuit CONT.2 brings about operation of relays RB' in stage B and RC' in stage C, doing so by applying positive operating potential to lead *om'* and earth marking potentials successively to leads *mx'* and *my'*. The cross-linking trunk CL is assumed to afford a direct connection between the incoming and outgoing sides, with the supervisory function invested in the outgoing junction circuit. On the other hand it is contemplated that, in line with FIG. 2, the incoming and outgoing sides of a local call would be linked through a supervisory transmission bridge circuit. In these circumstances it would be convenient to connect all the outgoing junctions to a switching unit or units separate from other units to which local line circuits such as LC are connected. The linking circuits between any two units would then all be the same, namely including a supervisory bridge circuit when between two local units and providing a direct connection when between a local unit and an outgoing junction unit.

By reason of the series holding of the operated cross-point relays in an arrangement conforming to the invention, it becomes possible in an embodiment such as that of FIG. 4 to arrange the holding connection to be controlled from the supervisory outgoing junction circuit without requiring to use the P-conductor of the established path (which conductor may be required for other purposes) and without requiring any additional control conductor. A way in which this can be done is illustrated in FIG. 4. Once the control circuits CONT.1 and CONT.2 have established a communication path between the line circuit LC and the supervisory outgoing junction circuit OJ via the linking trunk CL, an A relay in the junction circuit will respond in the usual manner to a line loop presented across the + and − conductors at the line circuit LC in the calling condition. At contact A*a* relay A operates a slow-release holding relay B, which at contact B*b* applies negative holding potential to the adjacent end of the control connection through relays RB' and RC'. These relays initially hold between this negative potential and the positive operating potential applied at the other end over lead *om'*, and finally hold, after release of the control circuit CONT.2 and consequent removal of the operating potential, between the negative holding potential and an earth potential behind a relay H. This relay H operates in series with relay RB' and RC' when the holding potential is applied by contact B*b* and holds in series with them after release of the control circuit. At contact *h*, relay H establishes a holding connection for relays RA, RB and RC between earth potential behind contact *h* and negative holding potential connected over resistor RS: to the other end of the control connection through these relays, permitting control circuit CONT.1 to be released. To clear down the call, relay B is released, releasing relays RB', RC' and H. Relay H releasing brings about the release of relays RA, RB and RC.

There may be included a series resistance R*x'* between the earth marking potential and the set of contacts M': alternatively or additionally, a series inductance may be included at a position L*x* between the (positive) operating potential and the set of contacts OM. With such modification the initial operation and holding of the cross-point relays during the marking action of the control circuit would be assisted as follows: During the marking action it is necessary, as already described, for relay R' to hold in series with relay R upon the opening of contact M' following the closure of contact M. However, during the time that contacts M' and M are both closed relay R has earth potential connected to each side of it and therefore is completely unfluxed. As a consequence the high inductance initially presented to the operating circuit by the relay R when contact M' opens tends to reduce momentarily the current in relay R'. The provision of the series resistance R*x'* reduces this tendency by reason that when contacts M' and M are both closed relay R can become partially fluxed due to current flow through it between the earth marking potential and a positive potential developed across such series resistance. If the control arrangement included a further marking stage then a similar resistance may be provided between the earth marking potential and the set of contacts M in respect of the cross-point relay to be operated by that further stage, and so on, for other additional marking stages. Moreover, the values of these series resistances may be graded towards one end so that each cross-point relay to be operated receives substantially the same operating current irrespective of the number of previously operated cross-point relays already in circuit. The tendency for the current in relay R' to fall would also be reduced by providing the inductance at the position L*x*. In this instance when contact M' opens following closure of contact M, this inductance tends to generate along the holding path a high potential which counteracts the effect of the inductance presented to the path by the unfluxed relay R, and also that presented by any further unfluxed cross-point relays during the setting up of the path.

Although in the foregoing description of FIGS. 2 and 4 a positive operating potential, an earth marking potential and a negative holding potential have been employed for the setting up of a control connection for the cross-point relays such as relay R and R', it is to be appreciated that other suitably related potentials could equally well be employed. Also, the operating potential may be negative with respect to the holding potential, in which case, the rectifiers R*f* in the marking connections *m* and *m'* in FIG. 2 would be poled in the opposite direction to that shown.

What I claim is:

1. In a multi-stage relay cross-point switching system having its cross-points defined between multiples including control conductors and having its stages connected by links including corresponding control conductors, a relay for each cross-point having an operating winding and a make contact connected in series with each other between the control conductors of the multiples defining the cross-point, marking connection extending from the junction between the said winding of each relay and its said make contact and including a unidirectionally conductive device and control circuit means having said marking connections extending thereto and capable of controlling, in respect of any communication path through successive stages, the establishment by way of said control conductors and of the control conductors in the links between these stages, of a control connection which includes the series-connected operating winding and make contact of a relay in each such stage with the winding of such relay in each case electrically nearer a particular end of the control connection than is the contact, said control circuit means comprising means for applying an operating potential to said particular end of said control connection, and means for applying to the marking connections of the relays involved in said control connection, in sequence from said ends, a marking potential of such polarity with respect to the operating potential that the unidirectionally conductive devices in the marked marking connections will permit a resultant flow of operating current for the relays.

2. A system as claimed in claim 1 including holding means for completing, after operation of the last relay in said sequence, a holding connection for the operated relays extending over said control connection between on the one hand a holding potential connected at the other end of the control connection and having a polarity which is opposite to that of the operating potential with respect to the marking potential, and on the other hand a potential approximating to the marking potential and connected at the same end of the control connection as was the operating potential.

3. A system as claimed in claim 2, wherein the said holding means includes means for switching in the potential approximating to the marking potential after the operation of the last relay in the sequence, the said holding potential being permanently connected.

4. A system as claimed in claim 2, wherein the potential approximating to the marking said holding means includes means for switching in the holding potential after the operation of the last relay in the sequence, the said potential approximating to the marking potential being permanently connected.

5. A system as claimed in claim 2, having a busying connection extended to said control circuit means from the control conductor in each link whereby, when a communication path has been established and the relays involved are held in the control connection between the holding potential at one end and the potential approximating to the marking potential at the other end, a potential which is present on each link control conductor of the control connection as a consequence of a potential dividing action which the relays provide is extended over the relevant busying connection to the control circuit means as a busy marking pertaining to the link concerned.

6. A system as claimed in claim 2 arranged for interconnecting two terminal circuits by way of two of said communication paths and respectively terminated by said terminal circuits and interconnected by an intervening linking trunk, said system further including in association with said linking trunk holding relay means connected for operation in the holding connection for one of said paths, contact means in the terminal circuit terminating that path for completing the holding connection thereof, and contact means controlled by said relay means for completing the holding connection for the other of said paths.

7. A system as claimed in claim 6 wherein, said holding relay means is connected in the relevant holding connection adjacent the end thereof to which the potential approximating to the marking potential is connected and the holding connection includes between that end and the point at which said operating potential is applied a unidirectionally conductive device poled to prevent flow of operating current for the holding relay when said operating potential is present, but to permit flow of such operating current when it is replaced by the holding potential.

References Cited in the file of this patent

UNITED STATES PATENTS

| | | |
|---|---|---|
| 2,509,416 | Blackhall | May 30, 1950 |
| 2,913,534 | Henquet | Nov. 17, 1959 |
| 2,970,190 | Zahlhaas | Jan. 13, 1961 |